United States Patent
Salmikuukka

(12) 
(10) Patent No.: US 10,843,895 B2
(45) Date of Patent: Nov. 24, 2020

(54) METHOD FOR CONTROLLING A PASSENGER TRANSPORT SYSTEM BASED ON ONE OR MORE SYSTEM CONTROL PARAMETERS

(71) Applicant: Jukka Salmikuukka, Espoo (FI)

(72) Inventor: Jukka Salmikuukka, Espoo (FI)

(73) Assignee: Kone Corporation, Helsinki (FI)

( * ) Notice: Subject to any disclaimer, the term of this patent is extended or adjusted under 35 U.S.C. 154(b) by 304 days.

(21) Appl. No.: 15/364,633

(22) Filed: Nov. 30, 2016

(65) Prior Publication Data

US 2017/0081148 A1    Mar. 23, 2017

Related U.S. Application Data

(63) Continuation of application No. PCT/EP2014/062019, filed on Jun. 10, 2014.

(51) Int. Cl.
*B66B 1/30* (2006.01)
*B66B 1/28* (2006.01)
(Continued)

(52) U.S. Cl.
CPC .......... *B66B 1/3407* (2013.01); *B66B 1/2408* (2013.01); *B66B 25/003* (2013.01);
(Continued)

(58) Field of Classification Search
USPC ....................................................... 187/247
See application file for complete search history.

(56) References Cited

U.S. PATENT DOCUMENTS

| 4,989,694 A | 2/1991 | Ueshima et al. |
| 5,892,190 A * | 4/1999 | Morita ...................... B66B 1/18 |
| | | 187/382 |

(Continued)

FOREIGN PATENT DOCUMENTS

WO    WO-02/066356 A2    8/2002

OTHER PUBLICATIONS

International Search Report PCT/ISA/210 for International Application No. PCT/EP2014/062019 dated Feb. 5, 2015.

(Continued)

*Primary Examiner* — Christopher Uhlir
(74) *Attorney, Agent, or Firm* — Harness, Dickey and Pierce, P.L.C.

(57) ABSTRACT

The invention relates to a method for controlling a passenger transport system, which transport system comprises at least two passenger conveyors, as e.g. escalators or elevators, which transport system comprises a control for the passenger conveyors and for controlling passenger flow in the transport system. The control is connected to a passenger flow determination device for establishing a passenger flow reference value of the actual passenger flow to be expected in the passenger transport system, and which control further comprises a passenger guide system for controlling passenger flow in the transport system, which passenger guide system uses a cost function considering a set of system control parameters as passenger riding time, energy consumption, passenger waiting time, passenger transport capacity, maintenance demand, etc. The control uses a transport model simulating the function of the hardware components of the transport system under consideration of correlated system operating parameters as e.g. number of active passenger conveyors, passenger conveyor speed, stillstand times, door opening times etc. in connection with passenger flow, (Continued)

whereby the passenger flow reference value is input to the transport model and in an optimization process the system operating parameters are optimized under use of the transport model to meet the passenger flow reference value under consideration of at least one significant system control parameter from said set of system control parameters to achieve a best set of system operating parameters. The best set of system operating parameters is applied to the control of the passenger transport system.

17 Claims, 2 Drawing Sheets

(51) Int. Cl.
  *B66B 1/34* (2006.01)
  *B66B 1/24* (2006.01)
  *B66B 25/00* (2006.01)
(52) U.S. Cl.
  CPC ... *B66B 2201/216* (2013.01); *B66B 2201/223* (2013.01); *B66B 2201/23* (2013.01); *B66B 2201/24* (2013.01); *B66B 2201/404* (2013.01)

(56) References Cited

U.S. PATENT DOCUMENTS

| | | | | |
|---|---|---|---|---|
| 6,293,368 | B1* | 9/2001 | Ylinen | B66B 1/20 |
| | | | | 187/382 |
| 6,422,351 | B2* | 7/2002 | Tajima | B66B 1/30 |
| | | | | 187/290 |
| 6,889,799 | B2* | 5/2005 | Tyni | B66B 1/2458 |
| | | | | 187/247 |
| 7,621,376 | B2* | 11/2009 | Duenser | B66B 9/00 |
| | | | | 187/247 |
| 2008/0296099 | A1 | 12/2008 | Tyni et al. | |
| 2012/0090922 | A1* | 4/2012 | Elomaa | B66B 1/2458 |
| | | | | 187/247 |
| 2012/0279807 | A1* | 11/2012 | Finschi | B66B 1/2466 |
| | | | | 187/384 |
| 2016/0016756 | A1* | 1/2016 | Elomaa | B66B 1/3446 |
| | | | | 700/275 |

OTHER PUBLICATIONS

Written Opinion of the International Searching Authority PCT/ISA/237 for International Application No. PCT/EP2014/062019 dated Feb. 5, 2015.

* cited by examiner

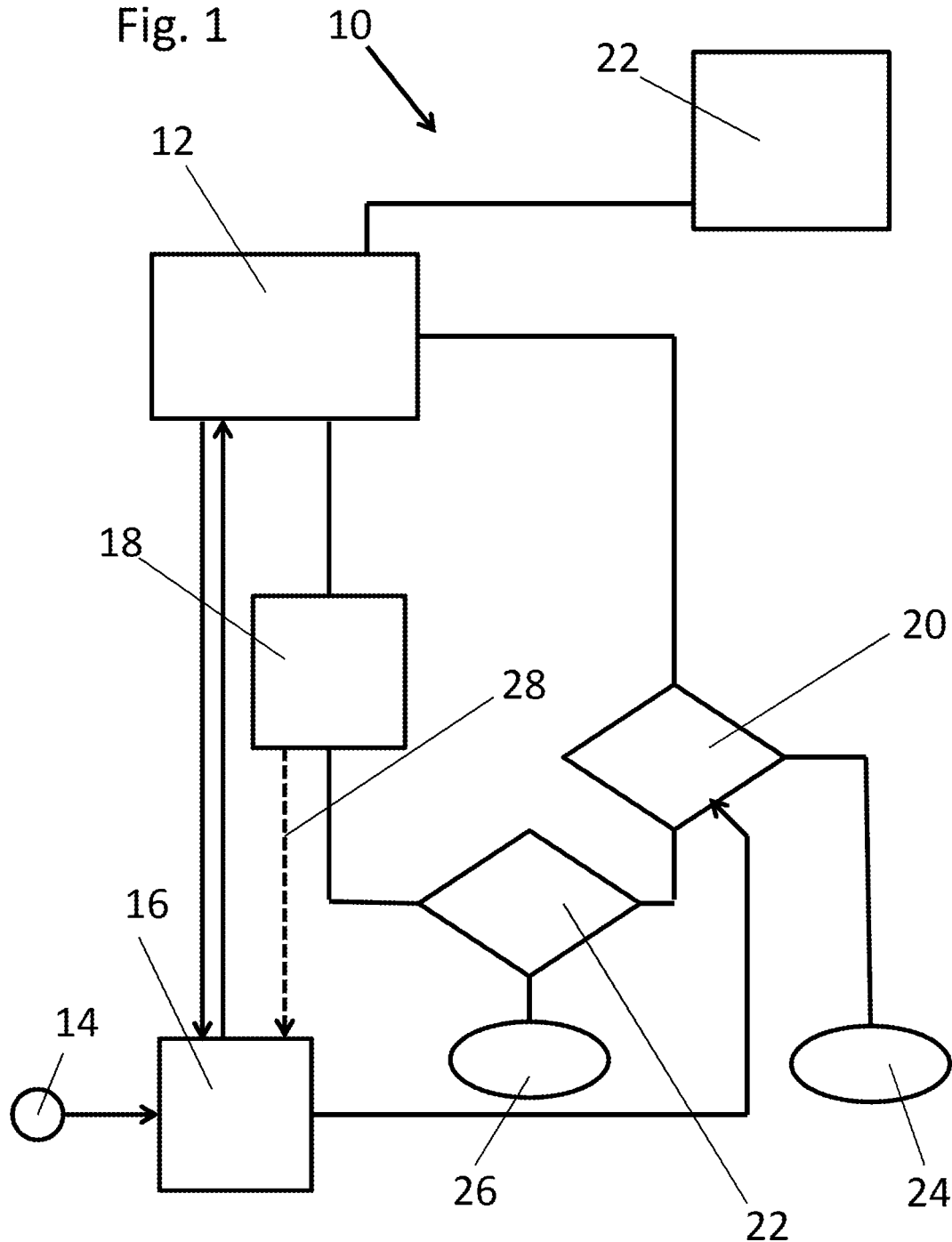

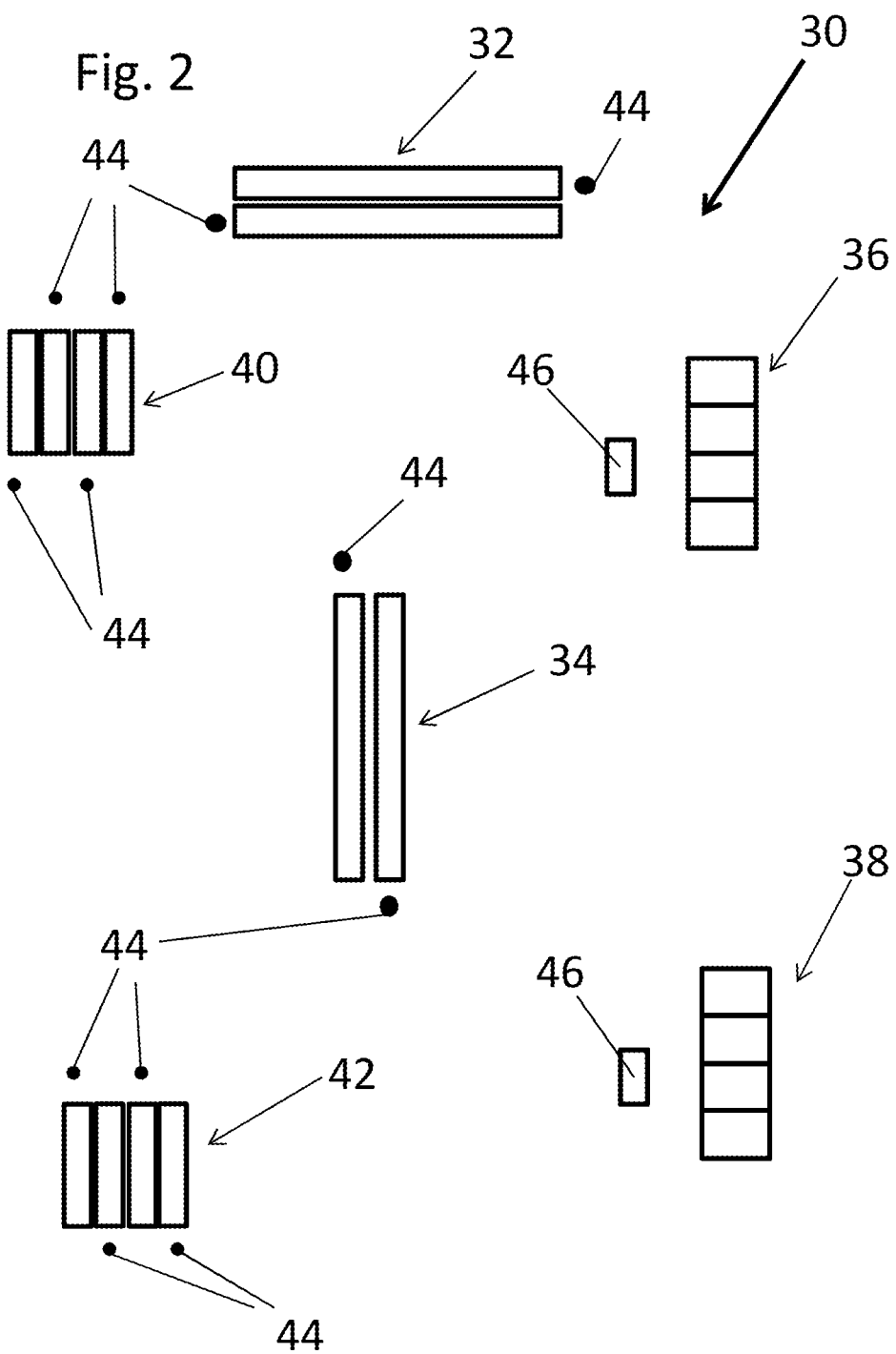

METHOD FOR CONTROLLING A PASSENGER TRANSPORT SYSTEM BASED ON ONE OR MORE SYSTEM CONTROL PARAMETERS

This application is a continuation of PCT International Application No. PCT/EP2014/062019 which has an International filing date of Jun. 10, 2014, the entire contents of which are incorporated herein by reference.

The present invention relates to a method for controlling a passenger transport system as well as to a transport system.

The current energy problems and rises in energy costs make it necessary to reduce the energy consumption of a transport system. Particularly, in a transport system comprising a lot of different types of passenger conveyors, for example in a shopping mall, the transport demand may vary essentially over the day time and even over the week and the season of the year. The WO 02/066356 discloses a control method for reducing the energy consumption of a passenger transport system. Anyway, that system is not able to control a transport system in an optimized manner where passenger flow happens between with multiple transport local parts and with multiple kinds of passenger conveyors as e.g. escalators, moving ramps and elevators.

It is therefore object of the present invention to provide a method for controlling a passenger transport system which is able to optimize the energy consumption in a locally distributed passenger transport system to a given passenger flow.

The object of the invention is solved with a method according to claim 1 and with a transport system according to claim 14. Advantageous embodiments of the invention are subject-matter of the dependent claims.

Some inventive embodiments of the invention are also presented in the description and in the drawings of the present application. The inventive content may also consist of several separate inventions, especially if the invention is considered in the light of expressions or implicit subtasks or from the point of view of advantages or categories of advantages achieved. In this case, some of the attributes contained in the claims below may be superfluous from the point of view of separate inventive concepts. The features of the various embodiments can be applied within the scope of the basic inventive concept in conjunction with other embodiments.

Generally, a passenger transport system is controlled via a passenger guide system which is in an elevator group for example implemented by a call allocation control of an elevator group control. The passenger guide system obtains the current transportation needs mostly via sensors or via call input devices of elevator groups. The elevator guide system gathers all call or transport flow data and guides the passengers via the different passenger conveyor through the transport system, which is usually implemented by several passenger conveyors as e.g. escalators or elevators or moving ramps. The control function of the passenger guide system is usually implemented via a cost function which uses a set of system control parameters, as for example passenger riding time, energy consumption, passenger waiting time, passenger transport capacity, maintenance demand, etc. Usually, the importance of each system control parameter is considered in the cost function with a weighting factor. This is per se known in the art.

The hardware components of the transport system, i.e. its conveyor drives, doors drives, are operated under use of a set of system operating parameters, as e.g. number and location of activated and/or shutoff passenger conveyors, the speed and/or acceleration of passenger conveyors, still-stand times, door opening times, etc.

Furthermore, the passenger transport system of the invention has a passenger flow determination device. In the case of an elevator this is usually implemented by its call input devices and in case of an escalators or moving ramp via entrance and/or exit sensors. The passenger flow determination device gathers therefrom actual passenger flow data and also records these data over the time to provide statistical and historical data to establish a passenger flow model which is able to provide the actual or estimated transport capacity demand and people flow in different local parts of the passenger transport system.

The present invention aims at the optimisation of said system operating parameters for a given passenger flow under consideration of at least one of said above mentioned system control parameters, particularly the reduction of the energy consumption. The object is solved with a method according to claim 1 and with a transport system according to claim 14. Preferred embodiments of the invention are subject matter of the dependent claims.

In the inventive method the transport system is adapted to a measured or estimated passenger flow situation via the use of a transport model which reflects the behaviour of the essential hardware components of the passenger transport system in connection with the correlated passenger flow in the transport system, particularly at different local parts of the transport system. Local parts may e.g. be certain elevator groups, escalators and/or moving sidewalks in different locations of the environment of the transport system, e.g. a mall or airport.

As carried out above, the system operating parameters define in which way the hardware components of the passenger transport system work in contrast to the system control parameters which define how the passenger guide system allocates transport capacity to the users of the transport system under certain optimization aspects. The system operation parameters are e.g. the number of the active and shut-down passenger conveyors, the velocity and acceleration of passenger conveyors, particularly elevators, door-opening and closing times, stopping time of an elevator at a floor, etc., whereas the system control parameters rely to targets to be achieved with the control via the passenger guide system (e.g. an elevator allocation control unit), as. e.g. a short passenger riding time, a short passenger waiting time, energy consumption, maintenance demand etc.

Via the invention the system operation parameters are going to be adapted in an optimized manner to a current passenger flow situation. Thus, the hardware components are controlled as to meet the passenger flow situation in the different parts of the transport system under optimisation of at least one significant system control parameter, e.g. the energy consumption.

Of course, this significant system control parameter can also be the passenger riding time and/or passenger waiting time, etc. The passenger flow which is to be met by the passenger transport system is given by at least one passenger flow reference value which is established by the passenger flow determination device.

During the optimization process sets of modified system operating parameters are fed to a transport model as to simulate the effect of modified system operating parameters with respect to the resulting passenger flow. During the optimization it is ensured that on one hand the current or estimated passenger flow established by the passenger flow reference value in the passenger transport system is met and that on the other hand a fitness value of the modified transport model (modified with a set of modified operating parameters) will be improved with respect to the at least one significant system control parameter. The optimization is terminated until a certain termination criterion has been met, e.g. until a certain time has passed or until a certain convergence of the fitness values is obtained. The best set of modified system operating parameters from the optimization process is then transferred from the transport model to the control of the passenger transport system to perform the control of the hardware components under the current passenger flow conditions. During this optimization process, the system operating parameters may particularly be changed by shutting off certain passenger conveyors and/or by reducing their transport capacity e.g. by reducing their transport speed and/or acceleration and/or by prolonging stand-still times and door opening times. For example, in an elevator group with eight elevators, four elevators can be shut off during low traffic periods and in a mall even some of redundant escalators can be shut off. Furthermore, remaining passenger conveyors may be operated with a reduced speed which again reduces the energy consumption.

Of course, it is possible also to optimize the weighting factors of the system control parameters of the passenger guide system. This ensures that not only the system operating parameters of the transport system are adapted to a certain people flow situation but that also the control targets of the passenger guide system are optimized with respect to the significant system control parameter. This can be obtained by optimizing the weighting factors of the system control parameters in the cost function of control algorithm in the passenger guide system. This will lead to a much more efficient operation of the complete passenger transport system particularly if this system comprises distributed local passenger conveyors as e.g. in a shopping mall, in an airport or in crowded public places. Accordingly, in a preferred embodiment of the invention, also the system weighting factors of the system control parameters are changed in an optimization process to obtain an adapted control behaviour of the passenger guide system.

For the optimization it is possible to store sets of weighting factors of system control parameters in the passenger guide system for different sets of system operating parameters. By this measure, the simulation of the transport system in the transport model can always be performed with a set of adapted weighting factors of the system control parameters of the passenger guide system. Thus also the control targets of passenger guide system consider the hardware settings of the transport model caused by the set of modified system operating parameters. This is relevant because the change of the hardware environment of the transport system has an essential effect to behaviour the passenger guide system, particularly if certain elevators and escalators are put out of service during low traffic times. Accordingly, the different sets of system control parameters may consider a reduced number of active passenger conveyors and/or the fact that passenger conveyors are driven with a reduced speed. When during the optimization of the system operating parameters the system operating parameters are changed accordingly, then the optimization process may use the adapted set of weighting factors for the system control parameters in the transport system model to enhance the possibility to provide an optimal set of system operating parameters.

Preferably, the passenger flow determination device comprises/uses sensors in different local parts of an environment to detect the passenger flow in the transport system at distributed locations. Via this measure, not only the transport capacity of the transport system in total but also the passenger flow within local parts of the passenger transport system can be determined and used for the optimization of the control.

In a preferred embodiment of the invention, the passenger transport system uses a passenger flow model establishing the passenger flow in different local parts of the passenger transport system over the time, which passenger flow model is established under use of statistical and historical passenger flow data and under use of current sensor and/or call input data to establish the passenger flow reference value for the different local parts of the passenger transport system. Accordingly, the passenger flow determination device is a very helpful measure to determine the current need of transport capacity in different local parts of the passenger transport system. This passenger flow may very locally dependent on the daytime, on the time of the week as well as on the season of the year or particular days, e.g. celebration days. By considering historic and statistic passenger flow data of the past, this passenger flow model can provide exact forecasts of passenger flow in the passenger transport system, particularly if the historic and statistic data are combined with current passenger flow data from the sensors or call input devices of the elevators.

Preferably, in the optimization process the system operating parameters of the transport model are changed via an optimization algorithm to obtain a set of modified system operating parameters, and a fitness-value of each set of modified system operating parameters is established with respect to the at least one significant system control parameter, whereby only those sets of modified system operating parameters are further optimized which improve said fitness value. The optimization is performed until a termination criterion is reached. This termination criterion may be a certain runtime of the optimization process or a certain convergence of the fitness values. This measure ensures essential improvements of the transport system performance with a given passenger flow situation.

In a preferred embodiment of the invention the optimization algorithm is a genetic algorithm, whereby each gene comprises chromosomes defining said system operating parameters, and new generations of genes are established by cross-breeding, mutation, recombination of genes and only those genes are allowed to the next generation which improve said fitness value. This may result in a self-learning and self-improving software embedded control function of the transport system.

Advantageously each gene further comprises chromosomes defining weighting factors of the system control parameters. Via this measure it is possible also to optimize the control targets of the passenger guide system simultaneously with the system operating parameters of the hardware components of the transport system.

In a preferred embodiment of the invention, the transport system has particularly separately controllable local parts, whereby for each local part the optimization of the system operating parameters is performed separately.

As the inventive method aims to meet differing passenger flow requirements in different parts of the transport system, adapted measures for the change of the system operating parameters are the shutdown of at least one of the passenger conveyors, the change, particularly the reduction of the speed and/or acceleration of at least one of the passenger conveyors as well as the change particularly the limitation of the service range of at least one of the passenger conveyors, particularly elevators.

In a preferred embodiment of the inventive method the energy consumption is used as the significant system control parameter. In this case the control preferably comprises a power monitoring unit for monitoring the available power for the transport system and if the power monitoring unit indicates a restricted availability of power the optimization procedure is performed with a maximum energy consumption value as an optimization criterion to be met. Via this measure it is ensured, that a maximum allowable energy consumption available for the transport system is not exceeded in the optimization process, so that the transport system keeps up its functionality also in restricted power conditions, e.g. in emergency power conditions.

The invention further refers to a transport system comprising at least two passenger conveyors, as e.g. escalators or elevators, and a control for the passenger conveyors and for controlling passenger flow in the transport system, particularly for carrying out the inventive control method.

The control is connected to a passenger flow determination device establishing a passenger flow reference value. The control comprises a passenger guide system for controlling passenger flow in the transport system under use of a cost function considering a set of system control parameters, weighted by weighting factors. In elevator groups such a system is formed by a call allocation control. In a mixed transport environment an elevator call allocation control may be part of the passenger guide system, which also has to consider other passenger conveyors as e.g. escalators or moving sidewalks or ramps.

The control comprises a transport model simulating the operation of the transport system under consideration of system operating parameters, as for example passenger conveyor speed, still-stand times, number of active passenger conveyors, energy consumption, door opening times, etc., in connection with the correlated passenger flow. An optimizing unit is arranged in connection with the control which is configured to change the system operating parameters of the transport model to cope with the passenger flow reference value under optimization of at least one significant system control parameter from said set of system control parameters, particularly the energy consumption.

With respect to the advantages and effects of the inventive transport system, reference is made to the description of the inventive method.

Preferably, the passenger flow determination device is a passenger flow model which is created under the use of current passenger flow data as well as of historic and statistical data. Such kind of passenger flow model is able to mirror the actual people flow or transport capacity need in different parts of the passenger transport system so that the transport system may be optimized on one hand to meet the required transport capacity and on the other hand to optimize the at least one significant system control parameter.

In a preferred embodiment the inventive transport system has a power monitoring unit which is configured to output a maximum energy consumption value as optimizing parameter to the optimizing unit. Via this measure the control is configured to run the transport system always in a mode which satisfies the environmental power availability conditions.

The above mentioned modifications of the inventions can be combined arbitrarily as long as this is technically feasible.

The invention is hereinafter described schematically with respect to the enclosed drawing. Herein FIG. 1 shows a flow diagram of an optimization process, and FIG. 2 shows a transport system in a distributed environment, e.g. a mall.

FIG. 1 describes the optimization process 10 of a control 14 of a transport system. The optimization process uses a transport model 12 which reflects the hardware constellation of the current transport system together with its system operation parameters. The control 14 outputs currently used weighting factors of system control parameters to a virtual passenger guide system 16 which is part of the transport model 12. The control further outputs a significant system parameter to be optimized, which is for example the energy consumption, the passenger riding time, passenger waiting time, the total journey time, the maintenance demand, etc.

The optimization process 10 is either constantly running to consider the actual passenger flow or is initiated only when an essential change in the passenger flow occurs which is obtained by a passenger flow model 22, which calculates the expected passenger flow from statistic and historical data as well as from current sensor and call input data of the transport system. The passenger flow model forms the passenger flow determination device 22 and is shared by the control 14 of the transport system as well a by the transport model 12. Thus, the transport model 12 gets from the virtual passenger guide system 16—which may be part of the passenger guide system of the transport system—the control functions of the transport system and from the passenger flow model 22 the current or expected passenger flow in the transport system. Now an optimizer 18, e.g. genetic algorithm is started which modifies the current system operating parameters according to the current passenger flow data received from the passenger flow model 22. The resulting set of modified system operating parameters is fed to the transport system model 12 which produces a fitness value with respect to the significant system control parameter, preferably the energy consumption.

The fitness value is evaluated in a deciding box 20 on the question whether the modified system configuration of the transport model 12 really provides an advantage with respect to the current significant system control parameter. If the fitness value is not improved compared to the fitness value of the current system the optimization process 10 is shifted to step 24 where the optimizer 18 is initiated to generate a new set of modified system operating parameters to be fed to the transport model 12. If the fitness value is an improvement over the first or previous fitness values, the fitness is checked in a second deciding box 22, whether a termination criterion of the optimization process is met, e.g. whether the fitness value converges in a certain way or whether a certain time has already lapsed. In this case, the current best set of modified system operating parameters is forwarded to the control 14 of the passenger transport system in step 26.

If the termination criterion of the optimization process 10 is not met, the current set of modified system operating parameters is returned to the optimizer 18 for further optimization. During the optimization in the optimizer 18 not only the system operating parameters may be changed but also the weighting factors of the system control parameters of the virtual passenger guide system 16 which are forwarded from the optimizer 18 to the virtual passenger guide system 16 as indicated with a dotted line 28. Thus, the invention is able to change the system operating parameters of the passenger transport system, e.g. the number of active passenger conveyor, the speed of the conveyors, door open times and other parameters which affect the operation of the hardware components of the passenger transport system as well as the control targets of the passenger guide system of the transport system.

As an optimizer 18 a genetic algorithm may be used where the different system operating parameters and optionally also system control parameters are encoded as chromosomes in a gene. The genes are changed from generation to generation via typical genetic development procedures as mutation, cross-breeding (crossover), recombination etc.

The passenger flow model 22 is preferably established under determining the passenger flow or demand of transport capacity at different local parts of the passenger transport system.

FIG. 2 shows a transport system 30 comprising a first moving walk 32 and a second moving walk 34, a first elevator group 36, a second elevator group 38 as well as a first escalator bank 40 and a second escalator bank 42. In connection with the moving walks 32, 34 and the escalator banks 40, 42 entrance/exit sensors 44 are arranged which inform the control 14 of the transport system about the current passenger flow in the corresponding passenger conveyors.

The two elevator banks 36, 38 are using e.g. a destination control system with a correlated destination operating panel 46 wherein the departure floor as well as the destination floor of each elevator car are issued by each passenger (call data). Also these call data are forwarded to the passenger flow determination device 22 of the passenger transport system 30. The passenger flow determination device 22 records the passenger flow at the different local parts of the transport system 30 over the time, whereby a passenger flow model 22 is created which gives information about the expected passenger flow in different parts of the transport system 30 over the time of the day, the time of the week, the time of the month and the seasons of the year. This passenger flow model 22 is therefore able, i.a. in connection with the current signals from the sensors 44 and the destination operating panels 46, to produce a passenger flow reference value reflecting the actual passenger flow in different parts of the passenger transport system. This allows in connection with the optimization process in FIG. 1 the establishing of system operating parameters which on one hand deal with the actual demand on transport capacity and on the other hand optimizes the significant system control parameter, which preferably is the energy consumption of the transport system. Accordingly, the optimization might lead to the shutoff of one or several of the different passenger conveyors 32, 34, 36, 38, 40, 42 and optionally also the reduction of the speed and/or acceleration of one or several of the passenger conveyors.

The invention is not restricted to the embodiments shown in the figures but may be varied within the scope of the appended patent claims.

The invention claimed is:

1. A method for controlling a passenger transport system, having at least two passenger conveyors arranged at different locations in the passenger transport system, the at least two passenger conveyors including a combination of two or more of elevators, escalators or moving walkways to move passengers in a passenger flow within the passenger transport system, the method comprising:
    establishing a passenger flow model across the different locations in the passenger transport system based on statistical and historical passenger flow data and current sensor and/or call input data;
    establishing a passenger flow reference value for the passenger flow at the at least two passenger conveyors in the passenger transport system using the passenger flow model;
    controlling passenger flow in the passenger transport system based on a cost function considering a set of system control parameters including energy consumption;
    simulating, using a transport model, functions of hardware components of the at least two passenger conveyers in the passenger transport system based on system operating parameters, by applying a first modification of one or more of the system operating parameters to a virtual version of the passenger transport system, the system operating parameters including one or more of number of active passenger conveyors, passenger conveyor speed/acceleration, still-stand times, or door opening times in connection with the passenger flow;
    performing an optimization process of the system operating parameters under use of the transport model by,
        determining a fitness value associated with the energy consumption due to the first modification of the one or more system operating parameters,
        determining effects on the passenger flow throughout the different locations in the passenger transport system due to the first modification by inputting the passenger flow reference value to the transport model to simulate the effects on the passenger flow,
        evaluating the fitness value and the effects on the passenger flow due to the first modification, and
        iteratively further modifying the one or more system operating parameters to generate a second modification of the one more system operating parameters in consideration of the system control parameters and applying the second modification of one or more of the system operating parameters to the virtual version of the passenger transport system to achieve a best set of the system operating parameters; and
    applying the best set of the system operating parameters to the control of the at least two passenger conveyers in the passenger transport system.

2. The method according to claim 1, wherein the performing the optimization process further comprises:
    optimizing weighting factors of the system control parameters used to control the passenger flow.

3. The method according to claim 1, further comprising:
    detecting, via sensor data and/or call input data from a passenger flow determination device, passenger flow in the passenger transport system at the different locations of the passenger transport system.

4. The method according to claim 1, wherein the performing the optimization process further comprises:
    changing the system operating parameters of the transport model via an optimization algorithm to obtain a set of modified system operating parameters, and
    establishing a fitness value of each set of modified system operating parameters with respect to the system control parameters, and
    optimizing only those sets of modified system operating parameters which improve said fitness value such that the optimization is performed until a termination criterion is reached.

5. The method according to claim 4, wherein the optimization algorithm is a genetic algorithm including genes each of the genes including chromosomes defining the system operating parameters, and wherein
    the optimizing establishes a next generation of genes by cross-breeding, mutation, or recombination of genes such that only those genes are allowed to the next generation of the genes which improve the fitness value.

6. The method according to claim 5, wherein each gene further includes chromosomes defining the system control parameters.

7. The method according to claim 1, wherein
the passenger flow reference value includes passenger flow values for each of the different locations of the passenger transport system.

8. The method according to claim 1, wherein the controlling the passenger flow comprises:
initially controlling the passenger flow in the passenger transport system based on an initial set of system control parameters.

9. The method according to claim 1, wherein the performing the optimization process of the system operating parameter comprises:
changing the system operating parameters to shut down at least one of the passenger conveyors.

10. The method according to claim 1, wherein the performing the optimization process of the system operating parameters comprises:
changing the system operating parameters to reduce speed and/or acceleration of at least one of the passenger conveyors.

11. The method according to claim 1, wherein the performing the optimization process of the system operating parameters comprises:
changing the system operating parameters are to shut down at least one of the passenger conveyors.

12. The method according to claim 1, wherein the performing the optimization process of the system operating parameters comprises:
changing the system operating parameters to limit a service range of at least one of the passenger conveyors.

13. The method according to claim 1, further comprising:
monitoring available power for the passenger transport system, wherein
the performing the optimization process of the system operating parameters performs optimization with a maximum energy consumption value as an optimization criterion to be met, in response to the monitoring indicating a restricted availability of power for the passenger transport system.

14. A passenger transport system comprising:
at least two passenger conveyors arranged including a combination of two or more of escalators, elevators or moving walkways at different locations in the passenger transport system to move passengers in a passenger flow within the passenger transport system;
a passenger flow determination device; and
a controller configured to control the passenger flow in the passenger transport system by,
establishing a passenger flow model across the different locations in the passenger transport system based on statistical and historical passenger flow data and current sensor and/or call input data;
establishing a passenger flow reference value for the passenger flow at the combination of the at least two passenger conveyors in the passenger transport system using the passenger flow model,
controlling passenger flow in the passenger transport system based on a cost function considering a set of system control parameters including energy consumption,
simulating, using a transport model, functions of hardware components of the at least two passenger conveyors in the passenger transport system based on system operating parameters by applying a first modification of one or more of the system operating parameters to a virtual version of the passenger transport system the system operating parameters including one or more of number of active passenger conveyors, passenger conveyor speed/acceleration, still-stand times, or door opening times in connection with the passenger flow,
performing an optimization process of the system operating parameters under use of the transport model by,
determining a fitness value associated with the energy consumption due to the first modification of the one or more system operating parameters,
determining effects on the passenger flow throughout the different locations in the passenger transport system due to the first modification by inputting the passenger flow reference value to the transport model to simulate the effects on the passenger flow,
evaluating the fitness value and the effects on the passenger flow due to the first modification, and
iteratively further modifying the one or more system operating parameters to generate a second modification of the one more system operating parameters in consideration of the system control parameters and
applying the second modification of one or more of the system operating parameters to the virtual version of the passenger transport system to achieve a best set of the system operating parameters, and
applying the best set of the system operating parameters to the control of the at least two passenger conveyers in the passenger transport system.

15. The passenger transport system according to claim 14, wherein the passenger flow determination device comprises:
sensors and/or call input devices configured to detect passenger flow in the passenger transport system at different local parts of the passenger transport system.

16. The passenger transport system according to claim 14, wherein the controller is configured to perform the optimization process with a maximum energy consumption value as an optimizing criterion to be met.

17. A controller configured to control passenger flow in a passenger transport system that includes at least two passenger conveyors arranged at different locations in the passenger transport system, the at least two passenger conveyers including a combination of two or more of escalators, elevators and moving walkways to move passengers in a passenger flow within the passenger transport system, the controller comprising:
a memory and at least one processor, the memory containing computer readable code that, when executed by the at least one processor, configures the at least one processor to,
establish a passenger flow model across the different locations in the passenger transport system based on statistical and historical passenger flow data and current sensor and call input data,
establish a passenger flow reference value for the passenger flow at the at least two passenger conveyors in the passenger transport system using the passenger flow model,
control passenger flow in the passenger transport system based on a cost function considering a set of system control parameters including energy consumption, simulate, using a transport model, functions of hardware components of the at least two passenger conveyers in the passenger transport system based on system operating parameters by applying a first modification of one or more of the system operating parameters to a virtual version of the passenger transport system, the system operating parameters including one or more of number of active passenger conveyors, passenger conveyor speed/acceleration, still-stand times, or door opening times in connection with the passenger flow, perform an optimization process of the system operating parameters under use of the transport model by, determining a fitness value associated with the energy consumption due to the first modification of the one or more system operating parameters, determining effects on the passenger flow throughout the different locations in the passenger transport system due to the first modification by inputting the passenger flow reference value to the transport model to simulate the effects on the passenger flow, evaluating the fitness value and the effects on the passenger flow due to the first modification, and iteratively further modifying the one or more system operating parameters to generate a second modification of the one more system operating parameters in consideration of the system control parameters and applying the second modification of one or more of the system operating parameters to the virtual version of the passenger transport system to achieve a best set of the system operating parameters, and apply the best set of the system operating parameters to the control of the at least two passenger conveyers in the passenger transport system.

* * * * *